June 15, 1965   R. H. SLOWINSKI   3,189,135
DEMOUNTABLE PARTITION
Filed May 11, 1956   3 Sheets-Sheet 1
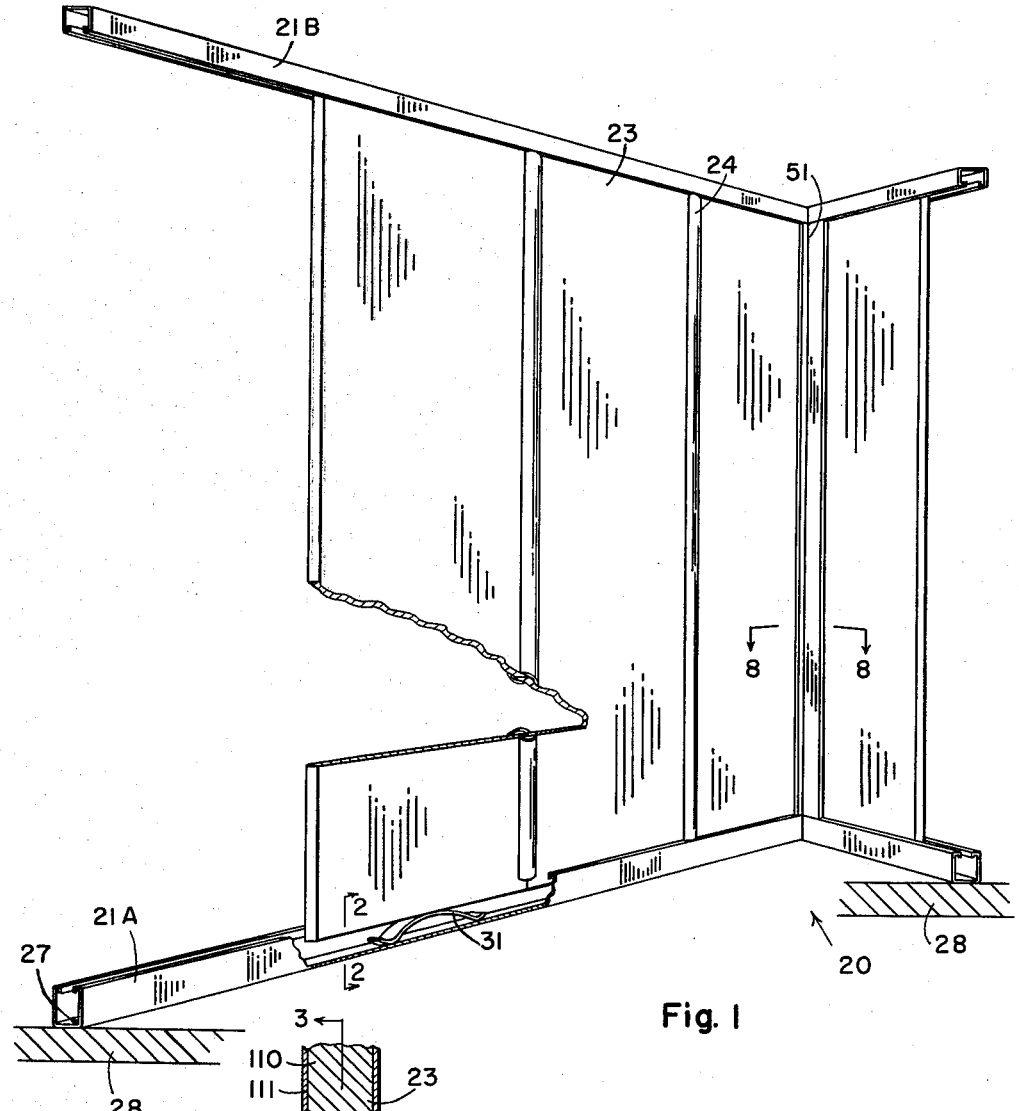
Fig. I
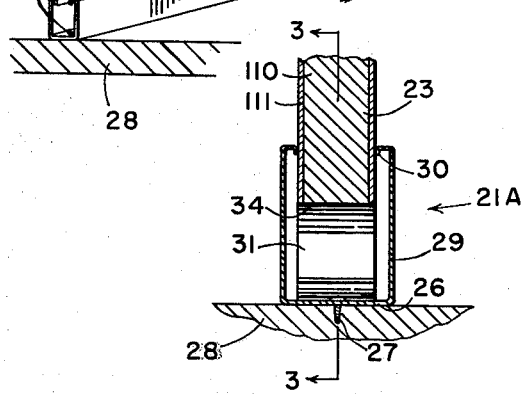
Fig. 2
INVENTOR.
Robert H. Slowinski
BY
ATTORNEY June 15, 1965  R. H. SLOWINSKI  3,189,135
DEMOUNTABLE PARTITION
Filed May 11, 1956  3 Sheets-Sheet 2

INVENTOR.
Robert H. Slowinski
BY
ATTORNEY

June 15, 1965  R. H. SLOWINSKI  3,189,135
DEMOUNTABLE PARTITION
Filed May 11, 1956  3 Sheets-Sheet 3

*INVENTOR.*
Robert H. Slowinski
BY
ATTORNEY 3,189,135
DEMOUNTABLE PARTITION
Robert H. Slowinski, Tonawanda, N.Y., assignor to National Gypsum Company, Buffalo, N.Y., a corporation of Delaware
Filed May 11, 1959, Ser. No. 584,307
2 Claims. (Cl. 189—34)

The present invention relates to a demountable partition system and to the elements thereof and their combinations.

With the present increased trend toward construction systems with greater variability of application and layout in office and industrial buildings, as well as toward low cost variable-type modernization systems for older industrial buildings, there has grown a considerable need for complete simplification in the manufacture and erection of demountable partitions.

The principal object of the present invention is to provide a greatly simplified, easily erected, improved demountable partition. Further, it is an object of the invention to provide an improved demountable partition runner for receiving the top and/or the bottom edges of demountable partition panels. Briefly, this is accomplished by providing channel runners having disposed therein resilient spring members capable of being compressed for insertion of partition panels and capable after completion of erection of resiliently but permanently retaining the inserted panels in their desired normal erected position.

It is a further object of the present invention to provide a demountable partition having improved resistance to sound transmission.

It is a still further object of the invention to provide a simplified, low cost, demountable partition of relatively few basic parts capable of rapid fabrication into a partition of high quality and permanent appearance.

An even further object of the invention is the provision of an improved demountable partition system readily adaptable for use in either ceiling height or partial room height partitions.

These and other objects and advantages of the invention will appear more fully when considered in connection with the following detailed description of preferred embodiments of the invention and the accompanying drawing in which:

FIG. 1 is a perspective view of a partially constructed partition system built in accordance with and embodying the invention, portions being broken away.

FIG. 2 is an end sectional view of the bottom portion of the partition of FIG. 1.

Referring now to FIG. 1, a partition 20 is shown partially erected which is constructed in accordance with the invention. Partition 20 includes elongate bottom channels 21–A and top channels 21–B, partition panels 23, and vertical joint strips 24.

Figure 3:
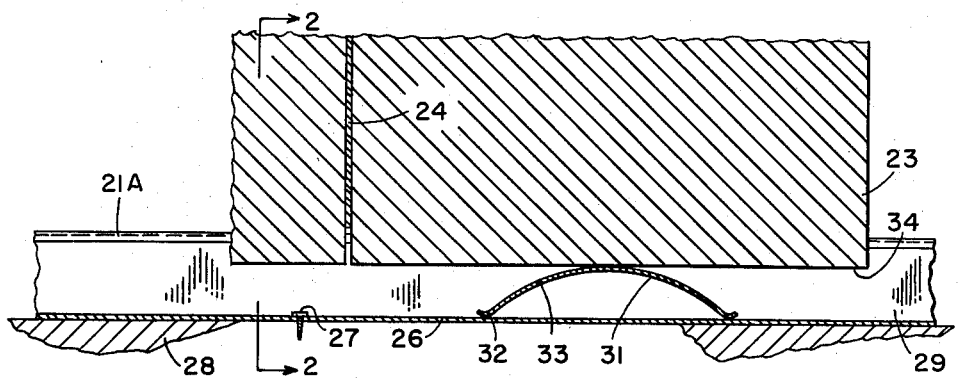
FIG. 3 is a sectional side view of the portion of said partition taken on line 3—3 of FIG. 2.

Bottom channels 21–A, FIGS. 2 and 3, are elongate members, which sectionally include essentially a bottom 26, having suitable means for attachment by bolts 27 to a floor 28, and having upwardly extending sides 29, which, in a finished partition, provide the usual wall baseboard strips. Sides 29 have at the upper edges an inwardly and thence downwardly directed panel-engaging lip 30.

Disposed unattachedly within bottom channels 21–A are bow springs 31. Bow springs 31 are preferably of a leaf-type, formed of bowed resilient spring sheet steel, having a width sufficient to provide lateral stability both when laid freely into the channel and when downwardly depressed, vertically supporting a panel 23. The width of bow springs 31 is preferably substantially equal to the thickness of panels 23; and the length of bow springs 31, when depressed, is substantially greater than the panel thickness but no greater than the panel width. Bow springs 31 have outwardly turned, opposed ends 32 resting on channel bottom 26 and a raised arcuate body 33 therebetween. Body 33 is resiliently depressed upon the insertion into the channel of a panel bottom edge 34.

Figure 4:
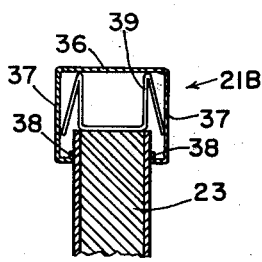
FIG. 4 is an end view of the top channel of the partition of FIG. 1.
Figure 5:
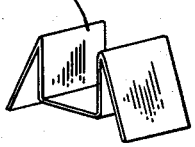
FIG. 5 is a perspective view of the ceiling channel clip of FIG. 4.

Top channels 21–B, FIG. 4, include a top face 36, downwardly extending sides 37, and inwardly and thence upwardly directed panel-engaging lips 38, a structure formed generally similar to base channels 21–A, but reversely positioned and somewhat less tall. In the top channel 21–B, lips 38 function to retain M-clips 39, seen clearly in FIG. 5, which are inserted at spaced positions therealong. The M-clips 39 are of generally M-shaped with side legs positioned against the sides 37 to center the clip over the panels 23 and a generally U-shaped center portion to space the panel top downwardly from the ceiling. The use of M-clips 39 in a ceiling height partition will be seen to maintain a panel 23 compressively against bow springs 31 with a panel height short enough for insertion into bottom channel 21–A from a substantially vertical position.

Figure 6:
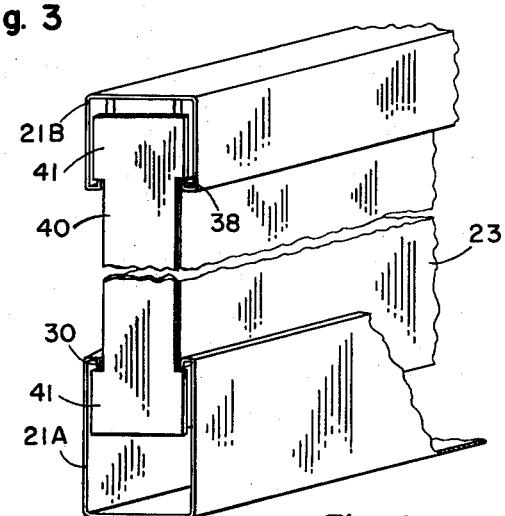
FIG. 6 is an isometric view of a portion of a partition with a novel connecting strap for a less-than-ceiling-height partition built in accordance with the invention.
Figure 7:
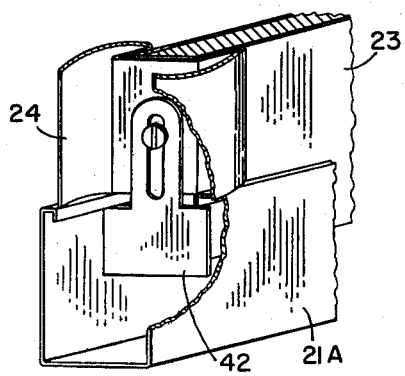
FIG. 7 is an isometric view of the base portion of a partition with a modified connecting means for a less-than-ceiling height partition.

Top channels 21–B may alternatively be attached to a ceiling to provide a ceiling-height partition or may be spaced from the ceiling and held parallel to and fixedly spaced from bottom channel 21–A by vertical joint straps 40, FIG. 6. Vertical joint straps 40, having a length slightly less than the height of partition desired, include widened end portions 41 at each end. Straps 40 extend between bottom channel 21–A and top channel 21–B with widened end portions 41 lockingly engaged below lips 39 at the bottom and above lips 38 at the top. One strap 40 is preferably disposed at alternate joints of adjacent panels 23 in partition 20, to restrain the upward urging of panel 23 and top channel 21–B caused by bow spring 31. A modified means for this restraint is shown in FIG. 7, wherein a widened-end plate 42 is affixed, as by bolts, to the bottom of joint strip 24 and lockingly engaged below lips 30. A similar plate 42 is similarly affixed and locked at the top (not shown).

In a full ceiling height demountable partition, built in accordance with the invention, the top channel 21–B is affixed to a ceiling in any suitable manner, such as the bolts 27 used in bottom channel 21–A. The fixed relative position of bottom and top channels would, thus, eliminate the need for straps 40 in the ceiling height partition.

To provide an unbroken or continuous partition, means for joining adjacent vertical edges of panels 23 are necessary. In one form of the invention channels 50–A and 50–B, formed identical to channels 21–A and 21–B, may be combined to form corner joints 51, FIG. 8, or either 50–A or 50–B may be joined back to back for use at mid-partition vertical joints replacing joint strip 24, FIG. 1.

Figure 10:
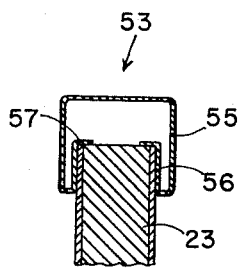
FIG. 10 is a sectional view of a modified ceiling channel.
Figure 9:
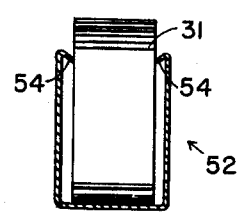
FIG. 9 is a sectional view showing a modified base channel.

FIGS. 9 and 10 show, sectionally, modified elongate bottom channel 52 and top channel 53, respectively, suitable for use in place of bottom and top channels 21–A and 21–B in accordance with the invention. Bottom channel 52 includes inwardly and downwardly acutely bent flanges 54. Flanges 54 are formed to receive and grasp the bottom edge of panels 23 and also, in a less than ceiling height partition, lockingly engage the straps 40 or plate 42. Top channel 53 includes downwardly extending sides 55, upwardly extending inner sides 56 which extend upwardly from the bottom of sides 55 to approximately the mid-point of sides 55. False-top flanges 57 extend inwardly from the upper extents of inner sides 56. False-top flanges 57 perform the function of M-clips 39 of FIG. 4, without the need for a separate clip element insertion, and providing a somewhat more stable false top. False-top flanges 57 further provide means for lockingly engaging the upper extent of strap 40 or plate 42.

Figure 11:
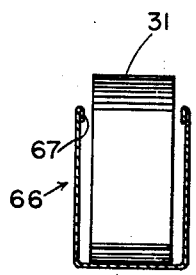
FIG. 11 is a sectional view showing a further modified base channel.

FIG. 11 shows a further modified base channel 66 having top lips 67 folded tightly inward providing a narrower over-all channel for where such is desired.

Figure 12:
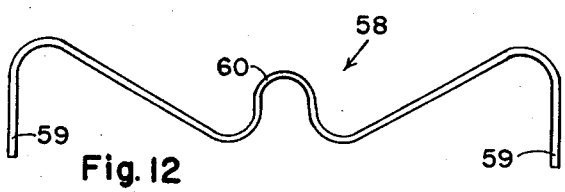
FIG. 12 is a top view of a modified wire spring for use in the base channel of FIG. 1.
Figure 13:
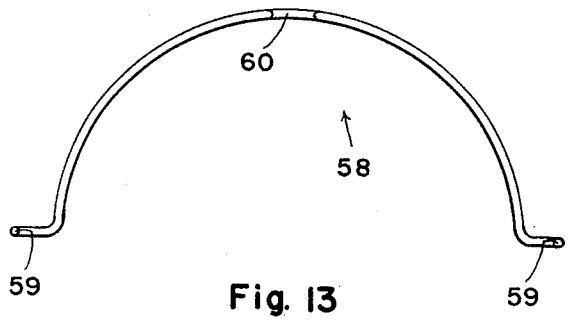
FIG. 13 is a side view of the spring of FIG. 12.

FIGS. 12 and 13 show a top and side view of a modified bow spring 58, formed of relatively heavy resilient wire. Wire bow spring 58 includes laterally extending end-wings 59 for lateral stability of the spring 58 when positioned in any of the bottom channels 21–A, 52 or 66 of FIGS. 2, 9 and 11, in place of bow spring 31. Wire bow spring 58 further includes a centrally disposed, laterally extending reverse wing 60 for a complete and stable engagement with a panel bottom edge 34.

Figure 14:
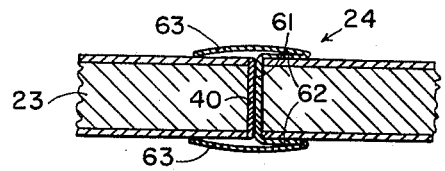
FIGS. 14, 15, 16, 17 and 18 are sectional views of a vertical joint between panels showing modifications of means for joining panel vertical edges.

FIG. 14 shows a preferred form of simplified, elongate vertical joint strip 24 having a center face 61, first channel-forming walls 62 extending perpendicular to face 61, and second channel-forming walls 63 extending reversely a distance greater than wall 62. Thus, walls 62 and 63 form opposed channels for the reception therein of vertical edges of adjacent panels 23. FIG. 14 includes also a strap 40, to show the manner in which strap 40 is disposed relative to any of the channeled vertical joint strips disclosed herein. Strap 40 is disposed within either of the opposed channels of a joint strip inward of the vertical edge of the panel 23, thus being hidden in the final less-than-ceiling-height partition when completed.

Figure 15:
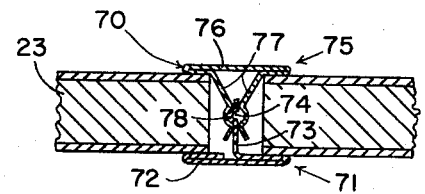

Vertical joint strips 70, FIG. 15, include a male facing strip 71 having an uninterrupted outer face 72 and an inwardly directed center flange 73 extending therefrom. Flange 73 has a bent edge 74 along the edge. Strips 70 further include a female facing strip 75 with an uninterrupted outer face 76 and acutely inwardly directed wing flanges 77 extending from each edge thereof. Wing flanges 77 have endward arcuate portions which in a pair of flanges form an outwardly opening tube 78 for the locking reception of bent edge 74 of the male facing strip 71.

Figure 16:
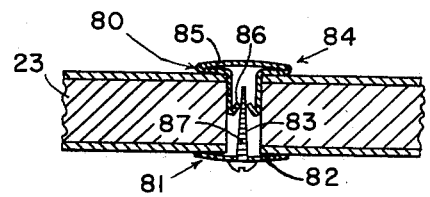
Figure 17:
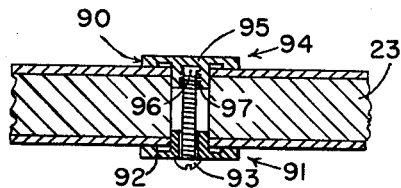

FIGS. 16 and 17 show vertical joint strips 80 and 90, respectively, each of which is comprised of two separate facing strips joined during construction by fastening means.

Strip 80, FIG. 16, includes a male facing strip 81 having an outer face 82 and screw-like fastening projections 83 extending between panels 23 at spaced positions along the extent of strip 81. A female facing strip 84 includes an uninterrupted outer face 85 and an inwardly directed flanged groove 86. Projections 83 include a plurality of threads 87 which engage and lock with flanged groove 86 when fitted together as shown in FIG. 16.

Strips 90, FIG. 17, include a male facing strip 91 having an outer face 92 and threaded bolts 93 extending rotatably therethrough at spaced positions along the extent of strip 91. A female facing strip 94 includes an uninterrupted outer face 95 and an inwardly directed elongate groove 96. The sides of groove 96 include a plurality of elongate ribs 97 capable of engaging and holding the threads of bolts 93 when tightened therebetween.

Figure 18:
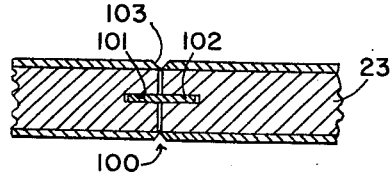

FIG. 18 shows a simplified junction 100 between panels, wherein the panels are kerfed 101 centrally along the vertical edges. An elongate flat metal strip 102, substantially equal in width to the combined depths of the adjacent kerfs 101, is disposed in two adjacent kerfs, providing the continuity between separate panels of a unitary partition. With the junction 100 being an exposed joint, it is preferred to form bevelled edges 103 along each edge to minimize slight imperfections in alignment.

Figure 8:
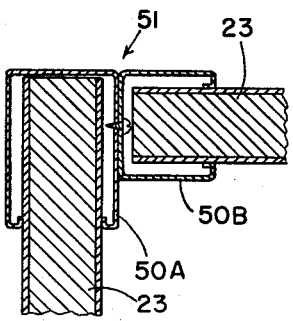
FIG. 8 is a sectional view of a vertical joint between panels showing a channel structure for joining panel vertical edges.

The construction of the ceiling height demountable partitions, embodying the present invention, consists of affixing bottom channel 21–A and top channel 21–B to a floor and ceiling along the disposition desired for the partition. At least one end of a demountable partition will ordinarily abut a permanent wall, whereat the channels 21–A and 21–B will also be disposed abutting the permanent wall. Demountable partition corners may be formed by abutting the end of one partition section against the side of a second partition section and affixing together the vertical edge joint channels 50–A and 50–B as shown in FIG. 8.

With channels 21–A and 21–B fixedly disposed, springs 31 and panels 23 may be very rapidly inserted. A spring 31 is placed within bottom channel 21–A generally centrally of the position into which a panel 23 is to be placed. The panel 23 is lifted upright and the bottom edge 34 is generally centered on spring 31. The panel is forced downward into channel 21–A, depressing spring 31 a sufficient distance to permit the positioning of the upper edge of panel 23 in upper channel 21–B, whereupon the downward force is released the spring 31 returns partially toward a normal undepressed shape, the spring return being sufficient to move panel 23 upward into contact with M-clips 39, of FIG. 4, but insufficient to relieve the total compression of spring 31. Spring 31, thus, maintains a resilient but firm positioning of panel 23 between the channels 21–A and 21–B.

Any one of the vertical joint strips of FIGS. 8, 14, 15, 16, 17 or 18 may be employed in the demountable partition, strip 24 of FIG. 14 being taken for example. In the ceiling height partition, strap 40 is not required. Strips 24, of a length equal to the distance between mounted channels 21–A and 21–B are slidably and resiliently placed on each edge of mounted panel 23. Along exposed edges of end panels, a channel 50–A or 50–B is preferred to provide a finished edge.

Subsequent progressively adjacent panels 23, with respective springs 31, are mounted in channels 21–A similar to the above method, as closely adjacent the prior mounted panel as possible and are then slid lengthwise of the channels 21–A and 21–B to engage in the strip 24 along the adjacent vertical edge. Another strip 24 is then mounted on the opposite vertical edge.

Less-than-ceiling-height partitions will be constructed generally similarly, affixing the base channel 21–A to the floor and retaining the vertical spacing between bottom and top channels by means of straps 40 between alternate panels. It will be apparent that for lateral stability, less-than-ceiling-height partitions will require either being affixed to a permanent wall at the end of a section of demountable partition, or, alternatively, the presence in the partition of a corner, constructed generally in accordance with FIG 8.

The panels 23 may be constructed of any suitable partition construction material, of a requisite impact strength or sound transmission character. In the preferred form, as shown in FIG. 2, a core 110 is of relatively lightweight, low density fiber board having laminated on each face thereof a thin cover ply 111 of a denser and harder sheet material, such as asbestos-cement sheet. A panel 23, so constructed provides a light, but strong, panel easily handled and erected, having a hard wall surface, resistance to sound transmission and strong enough to be repeatedly mounted and demounted in accordance with the invention.

Having completed a detailed disclosure of the preferred embodiments of my invention so that those skilled in the art may practice the same, I contemplate that variations may be made without departing from the essence of the invention or the scope of the appended claims.

I claim:

1. A demountable partition comprising an upwardly opening bottom channel affixed to a floor, a downwardly opening top channel affixed to a ceiling parallel to and above said bottom channel, a resilient, vertically compressed spring disposed within said bottom channel, a partition panel having a bottom edge disposed within said bottom channel above said spring and having a top edge disposed within said top channel, said compressed spring constantly urging said panel upwards, said spring and said panel being vertically restrained by said relatively fixedly spaced top channel, said top channel including an uppermost horizontal top face adjacent said ceiling, sides extending downwardly from the lateral edges of said top face, and inwardly directed lips at the bottom edges of said sides, said top channels having disposed therein at spaced positions self-retained spacing clips, said spacing clips being generally M-shaped, including two oppositely outwardly and downwardly directed arms for centering said clip in said top channel, and a central lower face for abutting the panel top edge and holding said panel spaced downwardly from said top face.

2. A demountable partition comprising an upwardly opening bottom channel affixed to a floor, a downwardly opening top channel affixed thereover to a ceiling, a plurality of partition panels extending between said channels, said panels having respective edges disposed within said channels, a resilient, leaf-type bow spring downwardly depressed beneath each said panel and within said bottom channel and resiliently urging said panel upward, said top channel having inwardly extending lips at the lower extremities of each side wall thereof, said top channel having disposed therein a plurality of generally M-shaped clips with side legs disposed against the channel sidewalls centering said clip over said panels, the central U-portion of said clip holding said panels spaced from the channel top, whereby the panel was originally mountable from a substantially vertical position and is resiliently held in spaced relation from the floor and ceiling, said panels being joined at vertical adjacent edges with means for making the partition continuous.

References Cited by the Examiner

UNITED STATES PATENTS

| 1,462,208 | 7/23 | Mayo | 50—12 |
| 2,481,794 | 9/49 | Stitt | 50—396 |
| 2,808,136 | 10/57 | Hammitt et al. | 189—34 |

FOREIGN PATENTS

| 709,239 | 5/54 | Great Britain. |

RICHARD W. COOKE, JR., *Primary Examiner.*

WILLIAM I. MUSHAKE, JACOB L. NACKENOFF,
*Examiners.*